US005897619A

United States Patent [19]
Hargrove, Jr. et al.

[11] Patent Number: 5,897,619
[45] Date of Patent: Apr. 27, 1999

[54] FARM MANAGEMENT SYSTEM

[75] Inventors: Raford S. Hargrove, Jr.; Christopher A. Zinda, both of Lubbock, Tex.

[73] Assignee: Agriperil Software Inc., Lubbock, Tex.

[21] Appl. No.: 08/335,460

[22] Filed: Nov. 7, 1994

[51] Int. Cl.$^6$ .............................................. G06F 157/00
[52] U.S. Cl. .................................... 705/4; 705/1
[58] Field of Search .................................... 364/401, 406, 364/429, 421; 395/201, 204, 925–930; 390/995, 684; 283/34; 705/1.4; 345/326, 23, 24; 434/150, 153; 701/213, 214

[56] References Cited

U.S. PATENT DOCUMENTS 4,553,206 11/1985 Smutek et al. ........................ 364/300

OTHER PUBLICATIONS

Beller, "Insurer sees payoffs in acting quick in a quake", the Journal of Commerce, Knight–Rider/Tribune Business News, Feb. 14, 1994 (Dialog file 609, Acc. No. 2328595).
Cross, "Agroclimatic Hazards and Dairy Farming in Wisconsin", Geographical Review (PGER) v84 N3, pp. 277–289, Jul. 1994 (Dialog file 484, Acc. No. 02216507).
Barna, "Farmers turn to cheese and BST for survival", Vermont Business Magazine (Brattleboro, VT, US), v22 N5 S1 p. 14, May 1994. Dialog file 635, Acc. No. 0499089.
Graham, "Weather Forecaster Keeps Radar Eye on Mother Nature", Denver Post (Denver, Co. US) SC p. 1 May 30, 1995 (Dialog file 635, Acc. No. 0299521).
Vandeveer et al., "Farmer response to modified crop insurance: A case study of corn in Indiana", American Journal of Agricultural Economics (AAE), v76 N1, pp. 128–140, Feb. 1994 (Dialog file 484, Acc. No. 01916499).
Burger, "Harvesting data with new tools", Insurance & Technology v18 N7 pp. 34–35, Jul. 1993 Dialog file 15, Acc. No. 00872747.

*Primary Examiner*—Frantzy Poinvil
*Attorney, Agent, or Firm*—Dorsey & Whitney LLP

[57] ABSTRACT

A farm management system that is an interactive system to acquire, portray, and process field related data to thereby set rates on a field by field basis, verify that each policy complies with company, state, and federal regulations, verify that the configuration of each field allows the field to be insurable, and provide a method to validate claims of crop damage caused by weather.

56 Claims, 11 Drawing Sheets

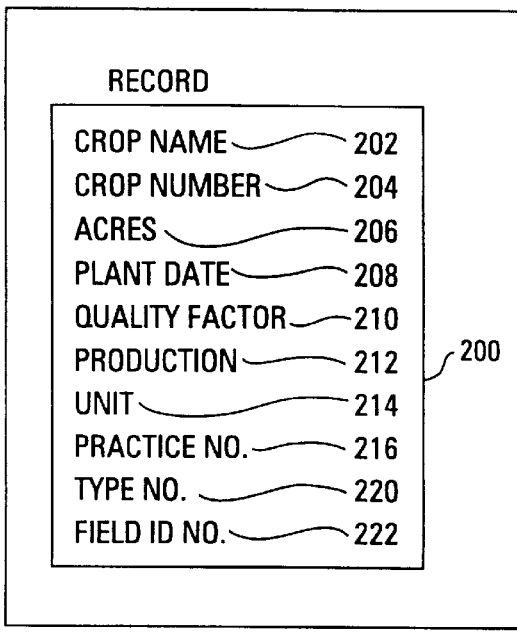
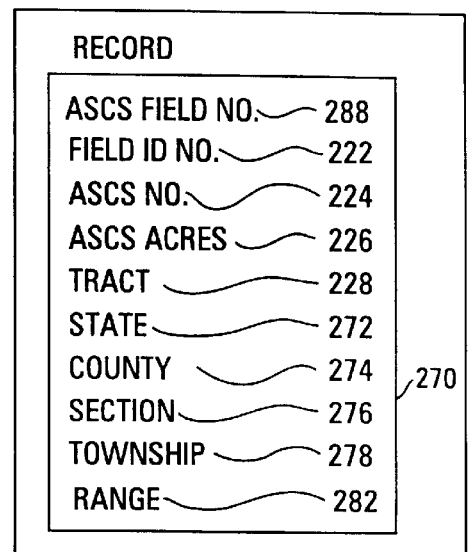
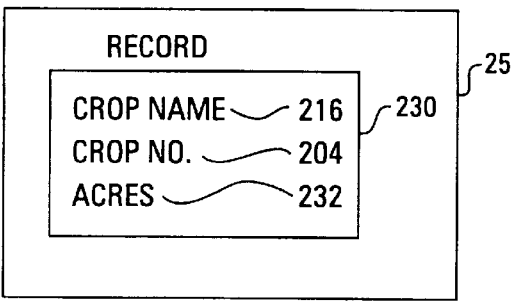
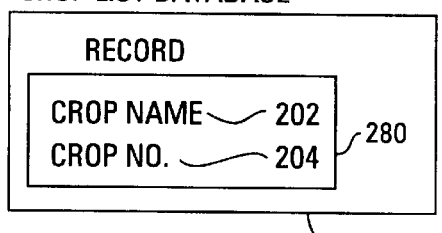
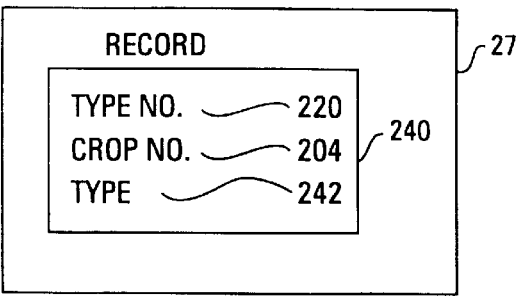

*Fig. 4*

| Name Finder | |
|---|---|
| NAME | POLICY |

```
———NAME/POLICY LOOKUP———
Last Name        First Name

HOMAN            HARLEY
HOMOLKA          FRANK E.
HONEY HART-FARMS
Hooper           Joyce
HOOVER           DONNIE
Hoover           Donnie
Hoover           John B.
Hoover           John B.
Hope             Carrie Ruth
Hopper           J.E.
Hopper           J.E.
HUPPER           LOYD
HORNBACK         ROBERT
```

P.O. BOX 551              (004006)
SEEAGRAVES, TX 79359
( )• • 0                  458-92-2971

POLICY SECURITY CODE

Last name and first name should be separated with
ENTER=Edit/add Point    F1=Edit Customer    F2=Change Year
Escape=END              INS=Add Customer    Tab=Enter Policy

*Fig. 7*

Chemical Applications

- 152 — Application Date
- 172 — Status: ○ Planned, ○ Actual
- Type of Chemical: ○ Fungicide, ○ Herbiede, ○ Insecticide, ○ Nutrient Application, ○ Fertilizer
- 188 — Find Chem
- 170 — Type of Infestation
- 162 — Applicator ID
- 160 — Applicator Name
- 158 — Chemical/Nutrient
- 168 — EPA Product Reg. #
- 174 — Aplicator Method: ○ Aeril, ○ Ground Spray, ○ Shanked, ○ Broadcast, ○ Cat Tractor, ○ Utility Tractor
- Chemical/Nutrient Application: Unit of Measure, Quality, Area Treated
- 175 — July 1994 calendar Buttons: Add (176), Delete (178), Weather (180), Save (182), Cancel (184)

Reference numerals: 150, 181, 183, 186

FARM MANAGEMENT SYSTEM

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention pertains to the field of data processing systems for a farm management system. More specifically, the present invention pertains to a crop insurance management processing system for use by insurance companies, insurance agents, and farmers. The system is implemented in computer hardware and software.

BACKGROUND OF THE INVENTION

Crop insurance is a heavily regulated industry. Insurance agents must comply with many regulations regarding the sale of Multi-Peril Crop Insurance ("MPCI"), Crop Hail Insurance, and other named peril insurance. Many of these requirements, as they relate to AgriPeril's Farm Mapping System, are specified below.

MPCI Industry

The acreage and production information required to underwrite MPCI policies is grouped by an insurance term called a "unit". These unit groupings are used by the insurance company and the Federal Crop Insurance Corporation ("FCIC") to calculate premium, liability, and claim payments. A unit may contain several fields owned and/or operated by the same farmer. The production history of these fields are used to calculate the insured's Actual Production History ("APH"), which is also maintained on a unit-basis. The calculation of each unit's APH must meet many underwriting regulations as established by the FCIC. The APH has a significant impact on the insured's premium, liability, and loss processing.

The total production of all fields contained within a unit is used to calculate potential loss payments. For example, if a farmer chooses to purchase coverage at a level of 75% of the unit's APH, the farmer will only receive a loss payment if the total actual and/or appraised production is less than 75% of the insured's coverage. Therefore, a farmer could have 25 acres of a 100 acre unit totally destroyed by hail, but would not be in a loss situation if the other 75 acres met or exceeded their APH for the given unit.

Consequently, when several fields are grouped into one unit, the company's risk for potential claims is reduced because damage in one field may be offset by harvested production in excess of the unit's APH from other fields comprising the unit. Therefore, it is generally in the best interests of the farmer to have as many units as possible, and it is generally in the best interests of the insurance company and the FCIC to have as few units as possible.

There are regulations an insurer and agent must follow in determining which field or fields comprise a unit. For instance, under FCIC regulations, it is generally not acceptable to have multiple units for the same crop in the same section (a section is a land description generally pertaining to one continuous land block that is one square mile or 640 acres and forms one of the thirty-six (36) subdivisions of a township. However, the acreage and shape of the section and/or township can vary by state and/or county.).

Currently, a farmer reports the acreage and production information on a unit basis. Reporting such crop data by unit requires the farmer to know the fields which compose each unit and correctly aggregate the required information. There are several problems with this method of gathering field-related information: (1) this method is cumbersome to the farmer, as farmers seed, cultivate, and harvest individual fields, not units; (2) this method is susceptible to unreported field information and mathematical errors by the farmer; and (3) this method relies on the farmer to make sure the insurance company is complying with FCIC regulations.

First, this method is cumbersome because a farmer seeds, cultivates, and harvests an individual fields, not units. The unit is an insurance derived term with which a farmer is not initially familiar. Moreover, unit structure can vary from year to year and crop to crop. These issues unnecessarily complicate the reporting of field related information and are susceptible to unintended mistakes.

Second, this process leads to errors in totalling the acreage and production information when units and/or fields are inadvertently missed and unreported. Such errors will give the farmer a false sense of security, since he believes that all his fields were reported and are insured, only to find out later when he files a claim that the field with the crop damage was not reported. Moreover, the insurance companies' records regarding the historical yield on a particular unit (APH) could be inaccurate, which can have an effect on insurance premiums paid by the farmer and on any potential loss payments. Reporting unit totals, rather than field totals, is also susceptible to inadvertent mathematical errors made by the farmer when aggregating acreage and production information.

Third, the farmer's or agent's field grouping may not meet the Federal Crop Insurance Corporation ("FCIC") underwriting standards. Usually, the agent does not know the number or location of all the fields grouped within each unit. The agent would have to locate the farmer's land on a map, and then determine if the groupings meet FCIC standards, assuming the agent has kept up with the regulations. This method is cumbersome and prone to error.

Clearly, there is a need for a system that allows the agent to obtain this field-related data more accurately, verify that all fields are reported, and verify that FCIC and company underwriting standards have been met.

Hail and Other Named Peril Insurance

When purchasing crop hail and other named peril insurance, the farmer must provide detailed legal descriptions of each field, specifically the section, township and range of the fields to be insured before the policy can be rated. Unfortunately, many farmers incorrectly state or do not know the correct legal description of each field they own and/or operate and the policy could possibly be rated incorrectly. In addition, if the field extends across more than one township/range (a range is one of the north-south townships in the U.S. land survey that are numbered east and west from the principal meridian of the survey), then it is often rated at the lowest rate township or range. Consequently, the insurance company may not be charging a premium which accurately corresponds to the risk being taken. This inaccurate correspondence between premium and risk can also occur if a farmer reports his land as being in a particular township so that he can pay a lower premium. For all these reasons, the current system may result in inaccurate ratings for each field.

Clearly, there is a need for a system that will not require the farmer to know the detailed legal description of his fields and a system which will enable the agent to correctly rate each field. Such a system would protect both the insured and the insurer.

A further problem can arise when a farmer submits claims to his insurance company after a crop has been damaged, including damage caused by weather. Currently, to determine the validity of a weather-related claim, the insurer must retrieve regional weather data where the field is located for the specified damage date. The insurer must then compare the weather conditions from the weather report to the weather conditions stated in the claim and determine if the claim is valid. This method is inconvenient, time consuming, and cumbersome.

Clearly, there is a need for a system which can easily verify the validity of crop-damage claims for damage caused by weather conditions.

SUMMARY OF THE INVENTION

To overcome these and other problems, the present invention provides an interactive farm management system designed to acquire, portray, and process field related data. This system will further be used to set rates on a field by field basis, verify that each policy complies with federal regulations and provide a method to validate claims of crop damage caused by weather.

The present invention uses a set of databases which contain information regarding the names of policyholders, the insurance policies held by the policyholders, maps of the United States, current federal and company regulations, and various crop, practice, type and field information. This data is used in conjunction with interface screens through which the user can input field related information to perform the various tasks set forth above. The system has an interface screen which allows the user to draw and add field boundaries on maps representative of the pertinent region. Moreover, using the interface screens, other field related data may be entered, modified, and retrieved on a field by field basis. The system then processes this information using data from the databases to provide a rate for each field. The system also uses the position of the field on the map to verify compliance with certain federal regulations. Moreover, the system verifies that combination of the crop, practice and type used by the insured is insurable in the particular state and county where the field is located. Finally, a weather database is used to verify the validity of crop-damage claims against the weather conditions recorded for the date and area the crop was damaged.

BRIEF DESCRIPTION OF THE DRAWINGS

FIGS. 2A–E show the contents of a record in the field ID database the crop seeding database, the crop list database, the practice database, and the type database, and the crop list database.

FIG. 4 shows a name finder screen.

FIG. 7 shows the chemical tracking screen.

DETAILED DESCRIPTION OF THE PREFERRED EMBODIMENT

Figure 1:
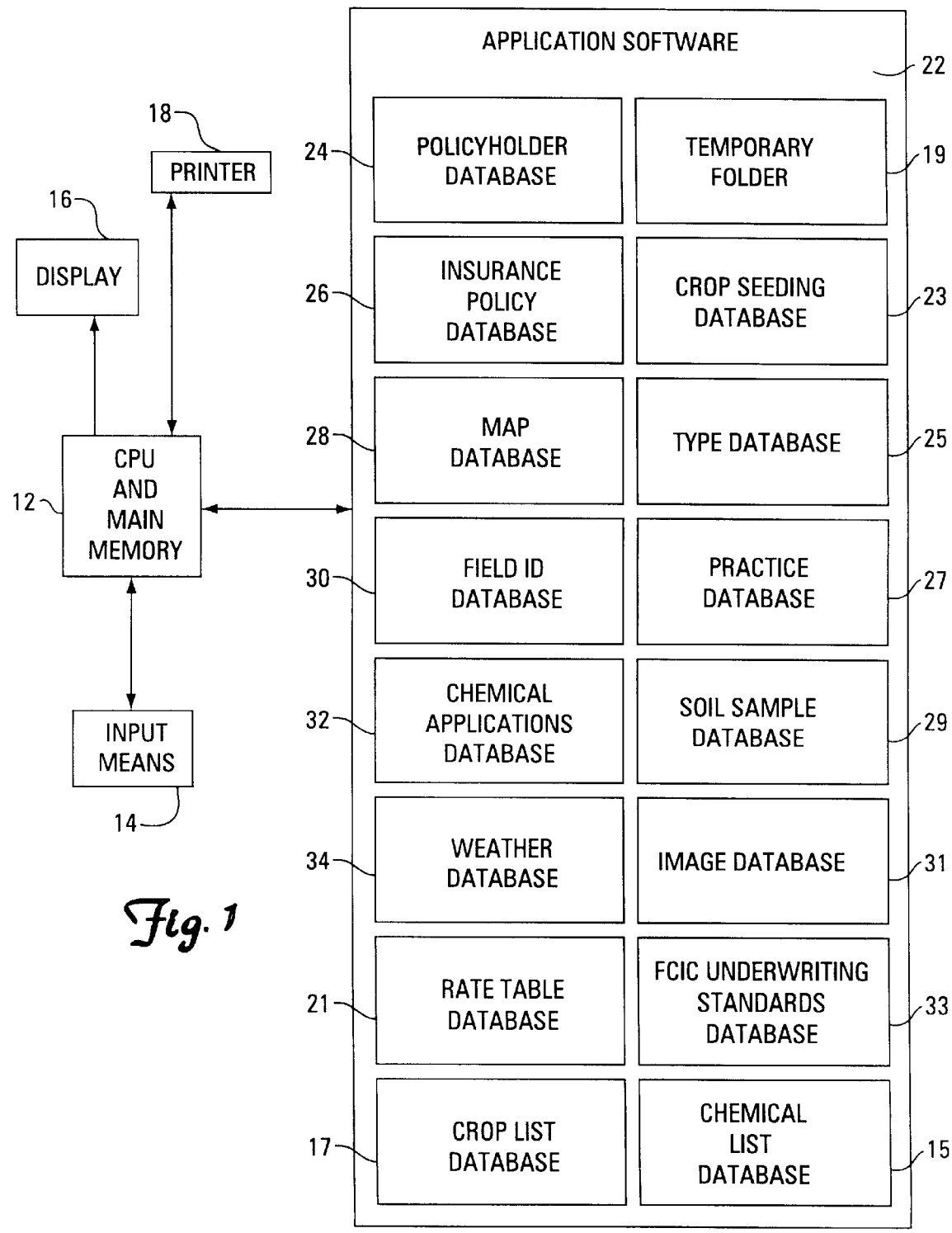
FIG. 1 is a block diagram of the farm management system.

The present system is shown in a general block-diagram form in FIG. 1. As shown in FIG. 1, the farm management system 10 comprises a processing unit or CPU with main memory 12, input means 14, such as a keyboard and a mouse connected to the CPU/main memory 12; and two output devices, a display 16 (such as a CRT, monitor, or other screen device) and a printer 18, also connected to the CPU/main memory 12. Storage device 20 (e.g. a disk drive or a hard drive) communicates with the CPU/main memory 12 and is the memory unit for storing application software 22, a policyholder database 24, an insurance policy database 26, a map database 28, a field identification ("Field ID") database 30, a chemical application database 32, a weather database 34, a rate table database 21, a crop seeding database 23, a type database 25, a practice database 27, a soil sample database 29, an image database 31, an FCIC underwriting standards database 33, crop list database 17, chemical list database 15, and a temporary folder 19. The system 10 also includes appropriate operating system software (not shown).

The preferred implementation platform of the present invention is a system implemented on an IBM compatible personal computer having at least four megabytes of main memory (RAM) and an eighty megabyte hard disk drive, with Microsoft Windows as the user interface and Microsoft Foxpro as the database management software. Individual personal computers can be networked to give multiple users access to common databases. The application software, which includes MapInfo, is customized using MapBasic and Microsoft VisualBasic. The application software 22 also includes several Microsoft VisualBasic modules purchased from Crescent Software and Media Architects to customize the interface screen's overall appearance and functionality. A Dynamic Data Exchange ("DDE") link is used to communicate data between applications.

The farm management system 10 functions as an interactive tool to facilitate the acquisition and portrayal of field related data. The method of acquiring information includes the capability to draw a polygonal shaped field on the map indicating its location, size, and shape. Also, because each field is positioned in its correct geographic region, this system 10 functions to determine rates on a field by field basis. The system 10 verifies (1) that acreage and/or production information has been entered for each field associated with a particular policy; (2) that the underwriting standards of the Federal Crop Insurance Corporation ("FCIC") have been met such as ensuring that multiple units have not been created for fields of the same crop contained in the same section; and (3) that the specified crop, practice, and type combination is insurable in a given region of the United States. Furthermore, this farm management system 10 provides the insurer with a tools to verify claims, thereby reducing fraud.

Continuing to refer to FIG. 1, the following is a brief description of the contents of each database and the interrelationship between the crop 23, type 25, and practice 27 databases. The policyholder database 24 contains the names of all the people having insurance policies with the insurance company. The insurance policy database 26 has a list of all policies issued by the insurance company.

The map database 28 contains a map of the United States which shows the states, counties, townships/ranges, sections, waterways, streets, and railroad boundaries. This map database 28 provides the agent and farmer the capability to (1) view all the fields covered by an insurance policy; and (2) add fields to a policy by drawing the field directly on the map without knowing the exact legal description.

FIG. 2A illustrates a sample record 270 in the field identification database 30 (shown as and hereinafter called the "field ID database"). A record 270 in the field ID database 30 comprises a field identification number 222 ("field ID numbers") for each field covered by an insurance policy. This field ID number 222 is a unique number assigned to each field when the field is drawn on the map. This field ID number is used to access and link all field related information from multiple databases. The record 270 also includes descriptors for the state 272, county 274, section 276, township 278, range 282, and tract 228. Furthermore, the record 270 includes the number assigned to the particular field by the Agricultural Soil Conservation Service ("ASCS") called the ASCS number 224 and the size of the field in acres as specified by the ASCS called ASCS acres 226.

The chemical applications database 32 has information on the various chemicals applied on each field.

The weather database 34 has information regarding the weather conditions, such as wind speed, temperature, humidity, etc., for the United States. The weather database 34 can also contain satellite photographs depicting the weather for various regions in the United States.

The rate table database 21 is used to determine the rate on a field by field basis for crop hail insurance and on a unit basis for MPCI based on the information provided by the farmer. Also, the rate database 21 allows the agent to make adjustments for various contingencies such as the farmer planting the crop after the final planting date as established by the FCIC.

The temporary folder 19 is a folder used by the system 10 to select records from the various databases and place them in this folder for manipulation by the user.

The soil sample database 29 contains information on soil tests done at specific test locations.

The image database 31 links individual fields to various images which can be added to the map or superimposed on the map to allow the user to easily and accurately draw field boundaries in their proper location on the map.

The Federal Crop Insurance Corporation ("FCIC") underwriting standards database 33 contains the regulations governing MPCI policies. Also, this database contains company regulations. The position of the fields on the map is used to verify that many of these regulations have been met.

Referring to FIGS. 1 and 2B–E, the crop seeding database 23, the crop list database 17, the practice database 25, and the type database 27 and their interrelationships will be described. FIG. 2B shows a representative record 200 in the crop seeding database 23. The crop seeding database 23 contains at least one record 200 for each field with the following information: (1) the crop name 202, (2) a crop number 204 which is a code for the crop name, (3) the number of acres planted of the crop shown as acres 206, (4) the date the crop was planted 208, (5) the quality factor 210 which is a number that represents the quality of the harvested crop, (6) production 212 of the field, and (7) a field ID number 222 which is a unique number assigned by the system 10 to a field when it is input into the system 10. Also, if the field is covered by a MPCI policy, the unit number 214 to which the field is grouped will be included. Furthermore, there is a practice number 216 and a type number 220 which is used in rating the policy and in validating against the records in the practice and type databases 25, 27.

FIG. 2C shows a representative practice record 230 in the practice database 25 which has a practice number 216, a crop number 204, and a practice descriptor 232. The system 10 validates that the entered practice 232 is valid for a given crop 202 by searching the practice database 25 for the entered crop 202 and practice 216.

FIG. 2D shows a representative type record 240 in the type database 27 which has a type number 220, a crop number 204, and a type descriptor 242. The type descriptor 242 specifies the variety of crop or the planting pattern used by a farmer for a particular crop 202. The system 10 uses the crop number 204 to verify that the correct type 242 is being used for a particular crop 202. The system 10 validates that the entered type 242 is valid for the given crop 202 by searching the type database 27 for the entered crop 202 and type 220.

FIG. 2E shows a representative record 280 from the crop list database 17. The crop list database 17 has a list of crops insurable in the United States. Each record 280 has a crop name 202 and a crop number 204.

These databases are accessed through the interface screens which will be described with reference to FIGS. 4–11. The interface screens allow the user to access information regarding a particular field. All the information regarding the fields insured by the insurance company are stored in these databases.

Figure 3:
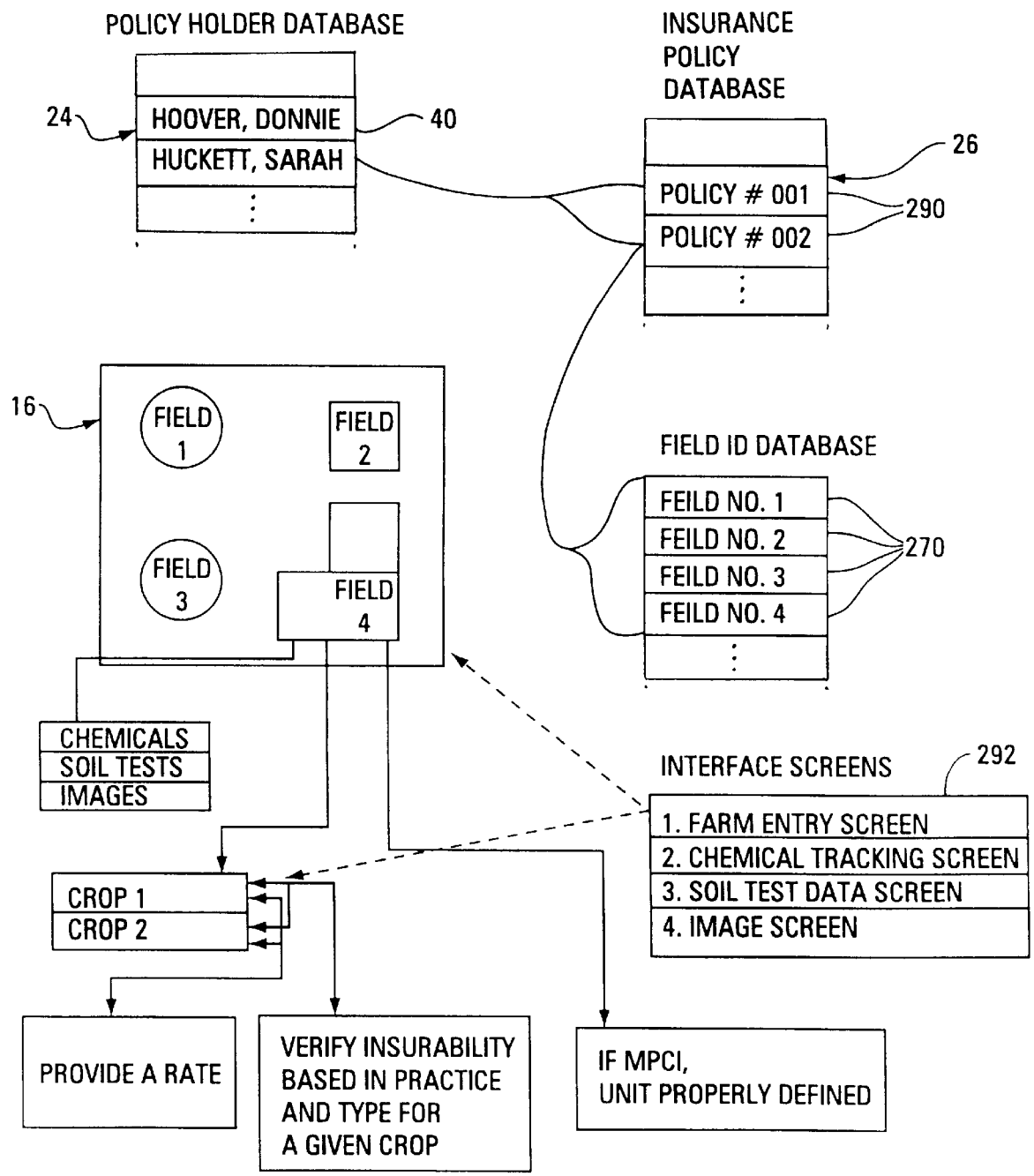
FIG. 3 shows a block diagram of the system.

With reference to FIG. 3, an overview of the operation of the system 10 will be described. FIG. 3 shows the policyholder database 24, the insurance policy database 26, the field ID database 30, and fields 85 displayed on the monitor 16. The user enters into the system 10, selects the name 40 of a policyholder, and selects a particular policy from the policies identified as issued to the particular policyholder. For instance, as shown in FIG. 3, the policyholder database 24 contains a plurality of policyholder names 40 including "Donnie Hoover" and "Sarah Huckett". If the user chooses "Sarah Huckett", then the system 10 finds the policies issued to Sarah Huckett, which in this example are policy #001 and policy #002. If policy #002 is chosen, the system 10 then finds the fields 85 covered by policy #002 and displays the fields 85 on a map display 80, showing the fields 85 in the correct geographic location. For example, the display or monitor 16 illustrates the four fields 85 covered by the policy #002. The user may also enter new fields 85 to be covered by a policy by simply drawing the shape of the field and placing it in the correct location.

The overall objective of the system is to lead a user through the collection of field-related data for a particular crop or crops (e.g., soy beans) planted and harvested in a particular time interval. As the data is collected, it is validated against various with regulatory requirements. If data entered is sufficient to meet insurability requirements, then a rate is determined based on various rate tables and insurance can be issued. Additional data associated with the field or fields insured can also be entered and linked to the field and policy (chemical application history, soil test results, image data). The various interface screens summarized in box 292 are used to input field-related data. As the user moves through the interface screens, the system 10 uses the data entered to verify that related company, state, and federal regulations have been met.

A field 85 may have been seeded to more than one crop during the year. For instance, field #4 in FIG. 3 has two crops. The system 10 will verify the insurability of each crop and the insurability of each crop, practice, and type combination. Moreover, for MPCI, the system will verify that the field groupings for a unit meet the FCIC regulations. Also, in addition to these verification functions, the system 10 will provide a rate on a field by field basis.

The system 10 allows an agent to collect the required data and spend far less time learning and applying the constantly changing regulations which govern the insurance industry.

As the agent/farmer provide the system 10 with the field-related data through the interface screens, the system 10 automatically identifies the applicable rules, applies the rules to the data entered, and informs the agent/farmer of any discrepancies between field related data and company, state, and/or federal regulations. The field related data are also used to identify and apply the proper rate structure. After the system has verified and met all underwriting requirements, the policy can be issued.

Next, with reference to FIGS. 4–11, the interfaces which allow the user (1) to directly enter the shape of his field into the system 10, and (2) to input field related data on each field will be described. The information in the databases used in conjunction with the field related data entered into the system 10 through the interfaces enable the system 10 to (1) provide a rate on a field by field basis, (2) verify that company and FCIC regulations have been met, (3) verify that the configuration of the field with respect to the crop 44, practice 52, and type 54 is insurable in the state and county where the field is located, and (4) analyze the validity of claims for crop damaged by weather conditions.

With reference to FIG. 4, when the farm management system 10 is activated, a name finder screen 39 having a name/policy lookup window 41, a policy window 47, an address window 35, a name text box 43, and a policy text box 45 are displayed on the monitor 16. The name/policy lookup window 41 contains names 40 of policyholders retrieved from the policyholder database 24. To access a particular policyholder, the user enters the name in the name text box 43 or a policy number in the policy text box 45. The FoxPro program accesses the policyholder database 24 and displays the name 40 on the monitor 16 through the name/policy lookup window 41 that match the text entered into the name text box 43. Also, as shown in FIG. 4, the selected policyholder's name 40 is highlighted. In FIG. 4, the policyholder whom the user is accessing is Donnie Hoover 40. Also, all the selected policyholder's insurance policies will be displayed in the policy window 47. Thus, if a policyholder has an MPCI policy, a crop hail policy, and other named peril insurance policies, then all the policies along with the state, county, and crops insured will be indicated. From this screen 39, the user can select the policy the user would like to view and/or modify.

Once the user has selected the particular policy that he would like to view and/or modify the CPU 12 through the Foxpro program accesses the field ID database 30 and the crop seeding database 23 which has uniquely defined field ID numbers 222 for each field that has been drawn on the system 10 and matches the state 272, county 274, ASCS # 224, crop name or number 202, 204, unit # 214, practice, and type descriptors 232, 242 to select from the field ID database 30 those fields having identical descriptors. All these records are placed in the temporary folder 19, which is then passed to the MapInfo program through the DDE link. The MapInfo program uses the records in the temporary folder 19 to access the map database 28 to find and display on the monitor 16 the field regions which represents the selected insurance policy (as will be described with reference to FIG. 5).

Figure 5:
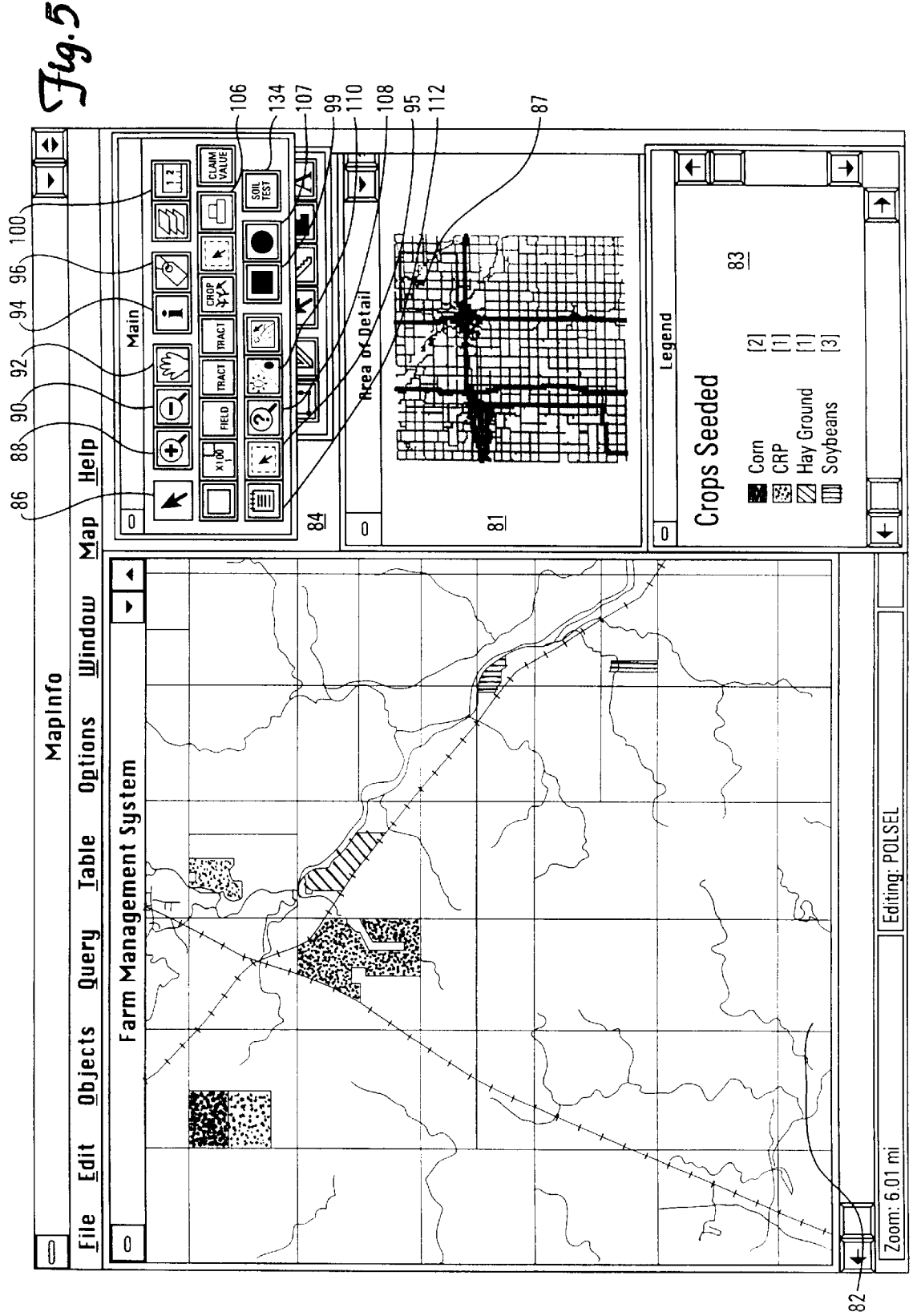
FIG. 5 shows a map screen illustrating a plurality of fields depicted on a map.

FIG. 5 shows the map interface 80 which comprises a general map 81, a detail map 82, a legend 83, and tools 84. The general map 81 displays the streets and county roads for the entire county in which the selected policy applies. The rectangular box 87 drawn in the general map 81 indicates the area currently displayed by the detail map 82, where vertices of the rectangular box 87 corresponds to the corner-points 89 of the detail map 82. Because this is a continuous link, anytime the view in the detail map 82 is changed, the rectangular box 87 is moved accordingly. The detail map 82 shows the fields 85 pertaining to the selected policy and are color-coded by crop. The legend 83 shows the crop 202 corresponding to the color of the field 85. Also, the legend 83 in brackets shows the number of fields 85 seeded with crop 202.

The tools provided in this custom map interface 80 provides the user with the capability to add or modify field information and to view various parts of the detail map 82. The standard tools which are part of MapInfo include the cursor 86, the zoom in icon 88, the zoom out icon 90, the pan icon 92, the information icon 94, the label icon 96, and the measure icon 100.

In addition to these standard tools, there are many customized tools designed for this system 10. The customized tools include the field drawing tool 111 which allows the user to draw additional fields for which the system 10 will automatically assign a unique field ID number 222 that will be stored in the field ID data base 30. Also, there are tools for displaying only a selected crop and/or unit 104, an icon to print various customized reports 106, an icon for zooming to specific legal descriptions 108, an icon for toggling images on or off 110, an icon to view the entire policy 95, an icon for automatic labelling of certain user specific information 97, an icon for drawing a rectangular shaped field 99 given a length and the acres of the field, and an icon 107 for drawing a center point pivot given the number of acres of the field. Furthermore, there is an icon for accessing entry screens 112 used in entering, modifying, and viewing data concerning a particular field. Finally, there is an icon 134 to access an entry screen for entering soil test data and an icon 350 to access an entry screen to verify the validity of weather related crop damage.

Continuing to refer to FIG. 5, the function of the field drawing tool 111, icon 99, and icon 107 for drawing irregularly shaped, rectangular shaped, and circular shaped fields 85 respectively will be described. The field drawing tool 111 allows the user to draw fields 85 of any shape on the detail map 82. The user can use the legal description icon 108 to position the map to the correct township and range. Because the section numbers, roads, railroad tracks, and waterways are included on the map 82, the user can identify the location of a particular field and draw it on the map 82. Once the field 85 is drawn, the CPU 12 assigns the field 85 an unique identification number called a field ID number 222 and adds a record to the field ID database 30. This number 222 will be used by the system 10 to access records so that the user can view and/or modify information concerning the field 85.

Also, a rectangular or circular field 85 can be drawn by using icons 99 and 107 respectively. To draw a rectangular field 85, the user only needs to input into the computer the length or width of the field 85 and the ASCS acres 226, which is the number of acres in the field as set by the ASCS. The system 10 will generate the size of the field 85 based on the entered field length and the ASCS acres 226 and place the field into the modified location. Similarly, for a circular field 85, only the ASCS acres 226 and/or center point has to be entered. The computer will calculate the field diameter and generate a circular field 85. Once the field is created, the CPU 12 assigns the field 85 a unique identification number 222 and adds a record to the field ID database 30. Because a majority of fields are either rectangular or circular in shape, icon 99 and icon 107 are very convenient ways to create fields 85 on the map 82.

To view, add, or modify information regarding a particular field, the user must select the entry screen icon 112. When the user selects the entry screen icon 112 (see FIG. 5) and a particular field 85 on the detailed map 82, a farm entry screen 120 (see FIG. 6) is displayed on the monitor 16. When the user selects the entry screen icon 112 and selects a field 85, MapInfo calls a procedure that executes a Visual Basic application which contains the farm entry screen 120. Visual Basic checks first for any preexisting farm entry screens 120 and closes any that it finds. Next, it shows the new farm entry screen 120 and information pertaining to the selected field. The farm entry screen 120 has text boxes for the section 124, the township 126, the range 128, the ASCS number 46, the field ID number 122, the tract number 47, the unit number 48, the crop 44, the practice 52, the type 54, the acres 58, the plant date 62, the quality factor (shown as "Qual Fact") 64, production number 66, and the ASCS acres 68. The farm entry screen 120 also has a calendar 142 and several buttons including an image button 132, a chemical applications button (shown as "Chem. Appl.") 130, an add button 136, a save button 138, and a cancel button 140.

To access the crop seeding database 23, the farm entry screen 120 uses the field ID number 222 of the field 85 chosen by the user. Using this number 222, the records in crop seeding database 23 which match this field ID number 222 will be gathered by the system 10. A field 85 can have multiple records in a crop seeding database 23 because a farmer may plant one crop in the summer and one crop in the winter. Another reason that one field 85 may have several records is that the farmer may plant several crops on one field (i.e, strip farming). The farm entry screen 120 sorts the corresponding record 200 found in the crop seeding database 23 by plant date 208 so that the record 200 with the most recent plant date 208 is first displayed. The most recent record 200 is used to fill in the unit 48, crop 44, acres 58, plant date 62, quality factor 64, and production 66 text boxes with the unit 214, crop 202, acres 206, plant date 208, quality factor 210, and production 212 data contained in the record 200.

The practice number 216 from the most recent record 200 retrieved from the crop seeding database 23 will be used to search a practice database 25. If the practice number 216 and crop number 204 matches one of the records 230 in the practice database 25, then the practice 232 specified in the record 230 is copied from the practice database 25 and placed in the practice text box 52 of the farm entry screen 120.

Similarly, the type number 220 from the most recent record 200 from the crop seeding database 23 is used to search the type database 27 to find one record 240 that has the same type number 220 and crop number 204. If a match is made, then the farm entry screen 120 copies from the type database 27 the type 242 specified in the record 240 and places it into the type text box 54 on the farm entry screen 120.

Finally, the farm entry screen 120 uses the section number, township number, range number, ASCS number 224, ASCS acres number 236, field ID number 222, tract 22, unit 214, and ASCS acres 206 that it received from MapInfo to fill in the corresponding text boxes 124, 126, 128, 46, 68, 122, 47, 48, and 58 on the farm entry screen 120.

Continuing to refer to FIG. 6, the procedure for editing the various text boxes in the farm entry screen 120 will be described. The crop text box 44 on the farm entry screen 120 is edited by making a selection from the crop list in the crop list database 17, which can be accessed by selecting the arrow 144 next to the crop text box 44, or typing the name of the crop in the crop text box 44. If an invalid crop is entered into the crop text box 44, the user is prompted to reenter the crop name 202. The crop list contains every crop name insurable in the United States. When a selection is made, the farm entry screen 120 updates the crop text box 44 with the selection.

The farm entry screen 120 uses the crop name 202 currently in the crop text box 44 to search the crop list database 17 until it finds a record 280 that has the same crop name 202. Once a record 280 with the same crop name 202 is found, the farm entry screen 120 copies from the record 280 in the crop list database 17 the crop number 204 corresponding to the crop name 202. The farm entry screen 120 then uses that number 204 to find all records 230, 240 in the practice database 25 and in the type database 27 that have the same crop number 204. Every time it finds a match in the practice database 25 or type database 27, the farm entry screen 120 copies the practice 232 specified in the record 230 from the practice database 230 and places it in the practice list or copies the type 242 specified in the record 240 from the type database 240 and places it in the type list on the farm entry screen 120. The practice text box 52 and the type text box 54 on the farm entry screen 120 are edited by making a selection from the practice or type list or by typing the name of the practice 232 or type 242 in the practice or type text box 52, 54. This procedure ensures that the correct practice 232 and type 242 are placed in the list boxes to correspond with the crop 202 placed in the crop text box 44, thereby guaranteeing the insurability of the crop 202.

Next, the plant date text box 62 is edited by clicking on the appropriate month, day, and year on the calendar 142. The calendar 142 will default to one month prior to the final plant date 208 as specified for the given state, county, crop, practice and type in the rate table database 21. The scroll bar 141 can be used to move the calendar 142 to the desired month and year. This feature is on all the calendars which appear on other interface screens. If the crop 202 is planted after the final plant date 208 specified in the rate table database 21, then the coverage will be reduced automatically as mandated by FCIC. The ASCS # 46, field Id 122, tract 47, unit 48, acres 58, quality factor 64, production 66, and ASCS acres 68 text boxes are editable by clicking on the text box and typing in the new information for the selected text box. However, the section 124, township 126, and range 128 text boxes cannot be edited by the user. This data is derived automatically from the field location and does not require user input.

The up arrow button 146 and the down arrow button 148 on the farm entry screen 120 allow the user to view the different crop seeding records from the set of records initially gathered for the selected field ID. The add button 136 allows the user to add a new record to the crop seeding database 23. The save button 138 allows the user to commit the changes made to the displayed crop seeding record to the corresponding record in the crop seeding database 23. Prior to updating the record in the crop seeding database 23, the save button 138 causes the crop text box 44, the practice text box 52, and the type text box 54 to be validated by searching the rate table database 21 with the entered year, state 272, county 274, crop 202, practice 232 and type 242. This is done to verify that the entered crop seeding information is insurable in the given state and county.

Although it should be noted that the acreage 206 information will be provided at the time of purchasing insurance, the insurance rates will be set on the APH/yield 212 totaled for all fields which comprise the insurance unit. The production number which will update the APH/yield 212 will only be provided by the farmer to the agent after harvest. This production number 212 will affect the following year's premium rate for the unit and corresponding field 85.

The system 10 performs additional validation using FCIC's guidelines for unit structures. The system 10 uses the fields 85 which have been superimposed on the map 82 to determine if various underwriting standards have been met. For example, system 10 verifies that multiple fields seeded to the same crop in the same section are not reported under multiple units numbers.

Agriperil's Farm Management System 10 allows the agent and the policyholder to visually locate each field 85 on the detailed policy map 82 and solicit the required crop seeding information on a field by field basis. Moreover, with this system 10, the farmer or agent can easily validate legal unit structures as defined by FCIC guidelines. Also, the system (1) allows new fields to be added to an existing policy, (2) enter corresponding information for all fields, (3) verifies that all FCIC standards are met, and that the crop 202, practice 232, and type 242 combination is insurable in the particular state and county.

At this point, the user has several options: (1) the user may continue editing records found in the crop seeding database 23; (2) the user may exit from the farm entry screen 120 and go back to MapInfo; and (3) the user may access the chemical applications screen, or the image screen.

If the user decides to exit the farm entry screen 120, then the Visual Basic applications stop executing and returns control back to MapInfo. Before the Visual Basic application shuts down completely, it passes to MapInfo via the DDE link the field Id 222, ASCS # 224, ASCS Acres 226, and Tract 228 so that MapInfo can update the Field ID database 30 of any changes to the elements that might have been made while the Visual Basic application was running. If the Cancel button 140 is clicked, then the Visual Basic application stops executing, returns control to MapInfo, and neither the crop seeding database 23 or field ID database 30 is updated.

Chemical Tracking

From the farm entry screen 120 (see FIG. 6), the user can select the chemical tracking screen 150 (see FIG. 7) by using the chemical applications button 130. FIG. 7 shows the chemical tracking screen 150 which comprises text boxes for the application date 152, the unit of measure 154, the chemical/nutrient 158, the applicator name 160, the applicator Id 162, quantity 164, the area treated 166, the EPA number 168, and type of infestation 170. Also, there are option boxes for status 172, type of chemical 156, and application method 174. Moreover, there is a calendar 175 and buttons for add 176, delete 178, weather 180, save 182, cancel 184, and find chemical 188.

The chemical tracking screen 150 uses the field ID number 222 from the farm entry screen 120 (see FIG. 6) to select all of the records in the chemical applications database 32 that have the same field ID number 222 and puts these matching records into a temporary folder 19. The temporary folder 19 with these chemical application records will be sorted by each record's application date 132 with the most recent record being first. The information displayed in each of the text and option boxes is retrieved from the most recent record in the temporary folder 19.

If the temporary folder 19 does not contain any records (i.e., there are no records in the chemical applications database that matched the field ID number 222), then all of the buttons, text boxes, and option boxes are disabled except for the add and cancel buttons 176, 184. In order to continue, the user must add a record to the temporary file and the chemical applications database 32. Alternatively, the user may use the cancel button 184 to exit from the chemical tracking screen 150 and return back to the farm entry screen 120.

This chemical tracking screen 150 aids the farmer in complying with various EPA and state regulations. In addition, the chemical records may protect the farmer from liability in the future. For instance, if a farm employee complains of a disability due to a chemical he claims was applied to the crops during a certain time period, then these records could either confirm the allegation or prove the allegation false. Consequently, this aspect of the system 10 can be advantageous to the farmer. The ability to provide this service may also be used by the company and it's agents as a competitive advantage.

In the following, the editing to the chemical tracking screen 150 will be described. To edit the application date text box 152, the user must select the day, month, and year from the calendar 175. The system defaults to the current date. After the user selects a date, the selection is placed in the application date text box 152. To edit the type of infestation 170, applicator name 160, applicator Id 162, quantity 164, area treated 166, and EPA product registration number 168 text boxes, the user has to click on the text box he wants to change and type in the new information.

To edit the unit of measure text box 154, the user must make a choice from a list of units which can be seen by clicking on the down arrow 186 to the right of the text box 154. The list includes the following units of measure: an ounce, a pint, a quart, and a gallon. After the user selects one of the above choices, his selection is displayed in the unit of measure text box 154.

The chemical/nutrient text box 158 can be edited in two different ways. The first way is by the user clicking on the text box 158 and typing in the new chemical or nutrient. The second way is for the user to click on the find chemical button 188. After activating the find chemical button 188, the user must type in the first three letters of the possible chemical he would like to select. The typing in of the first three letters causes the chemical tracking screen 150 to search the chemical list database 15 for that contains all of the chemical names and EPA numbers for every chemical whose name starts with the three letters entered by the user. The user then selects the chemical used from the created list. After he selects a chemical, the chemical tracking screen 150 copies the EPA Number from a corresponding record in the chemical list database 15 which contains the selected chemical and places it in the EPA product registration number text box 168.

Finally, the type of chemical 156, status 172, and application method 174 option boxes are edited by the clicking to a different choice in the appropriate option box.

The weather button 180 is used to enter the weather conditions present during the chemical application.

The up and down arrows 181, 183 allow the user to view and edit different records in the temporary folder 19. The save button 182 can be used to update the current record in the temporary folder and the corresponding record in the chemical applications database 32. When the delete button 178 is used, the current record in the temporary folder 19 and the corresponding record in the chemical applications database 32 are deleted.

Figure 6:
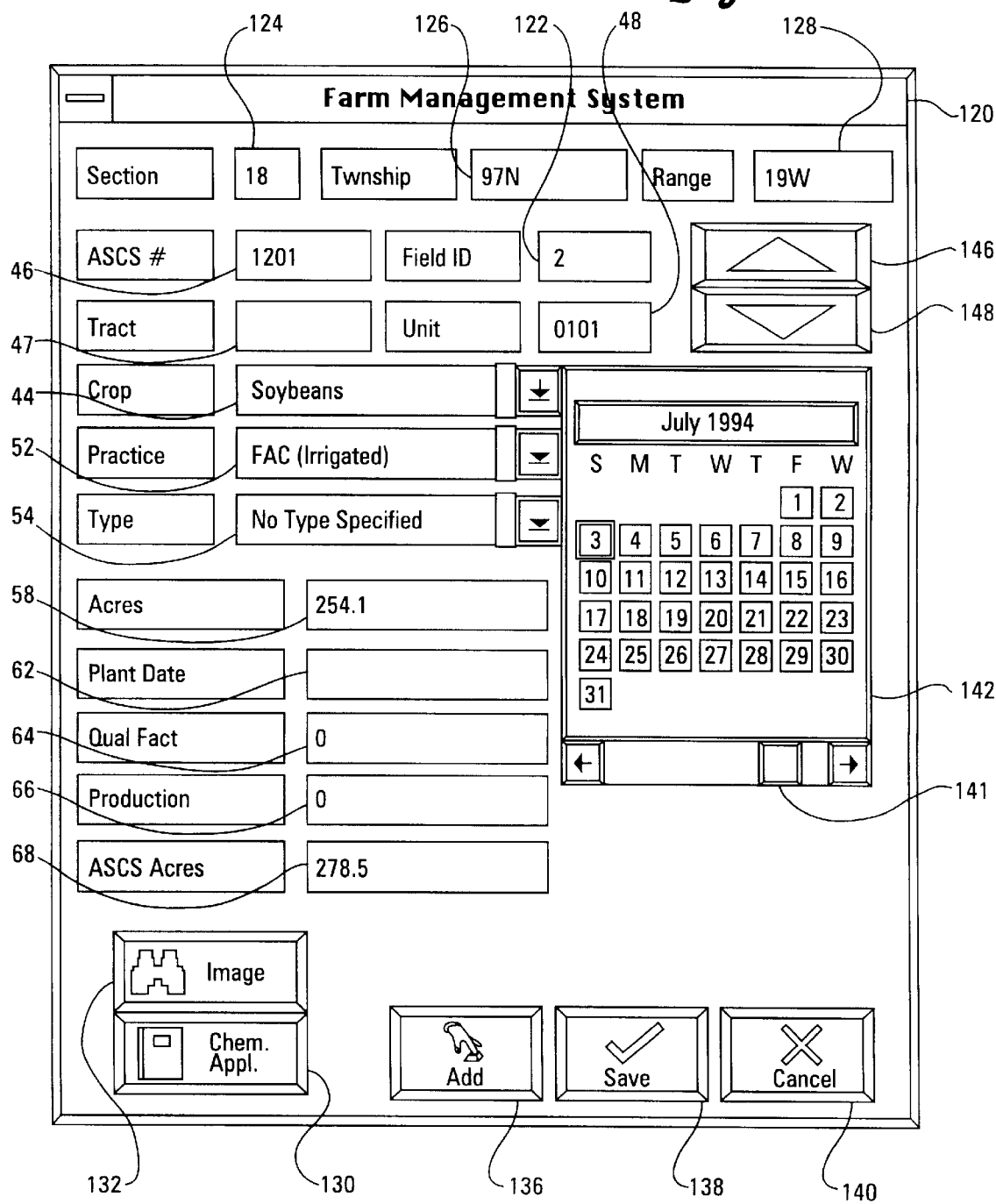
FIG. 6 shows the farm entry screen.

By selecting the cancel button 184, the user may exit the chemical applications screen 150 and return to the farm entry screen 120 (see FIG. 6). Next, the user may choose the image button 132 on the farm entry screen 120, which would cause the image path screen 190 to be displayed on the monitor 16.

Image System

Figure 8:
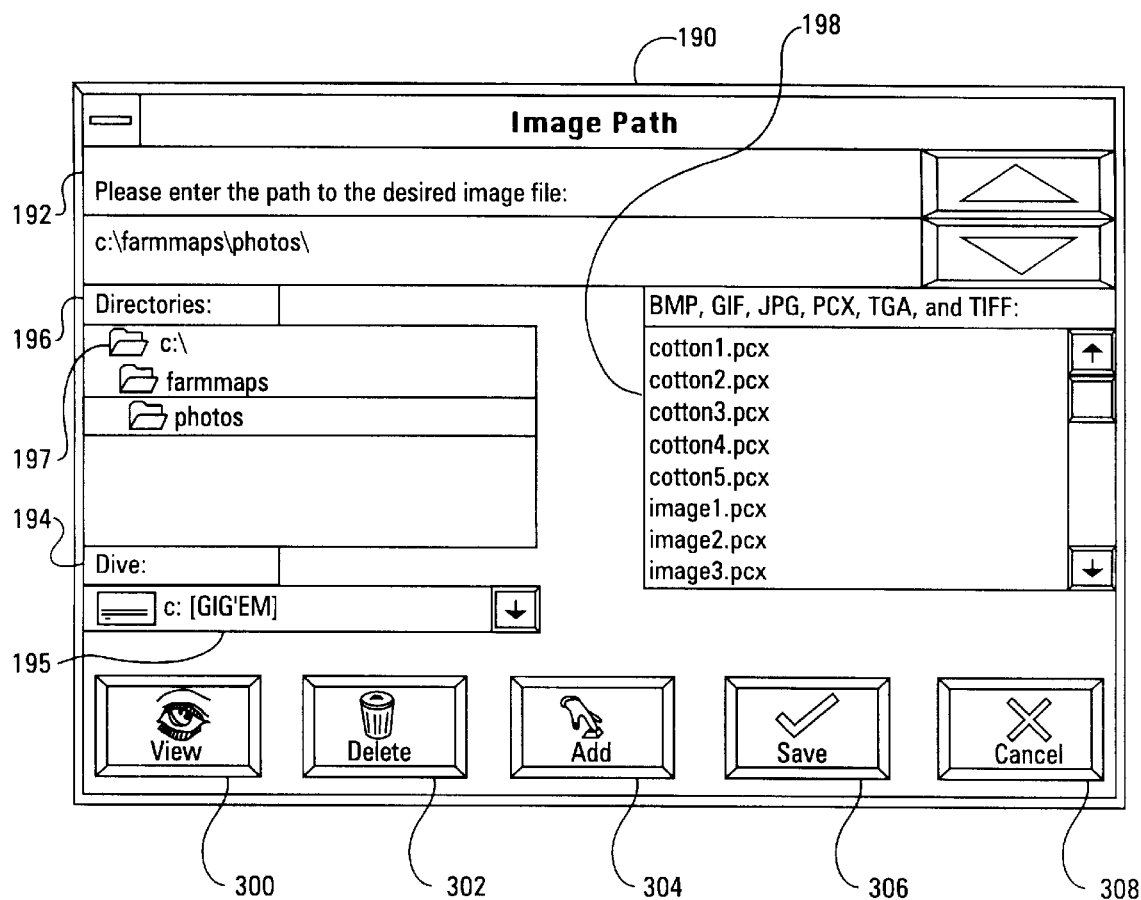
FIG. 8 shows the image path screen.
Figure 9:
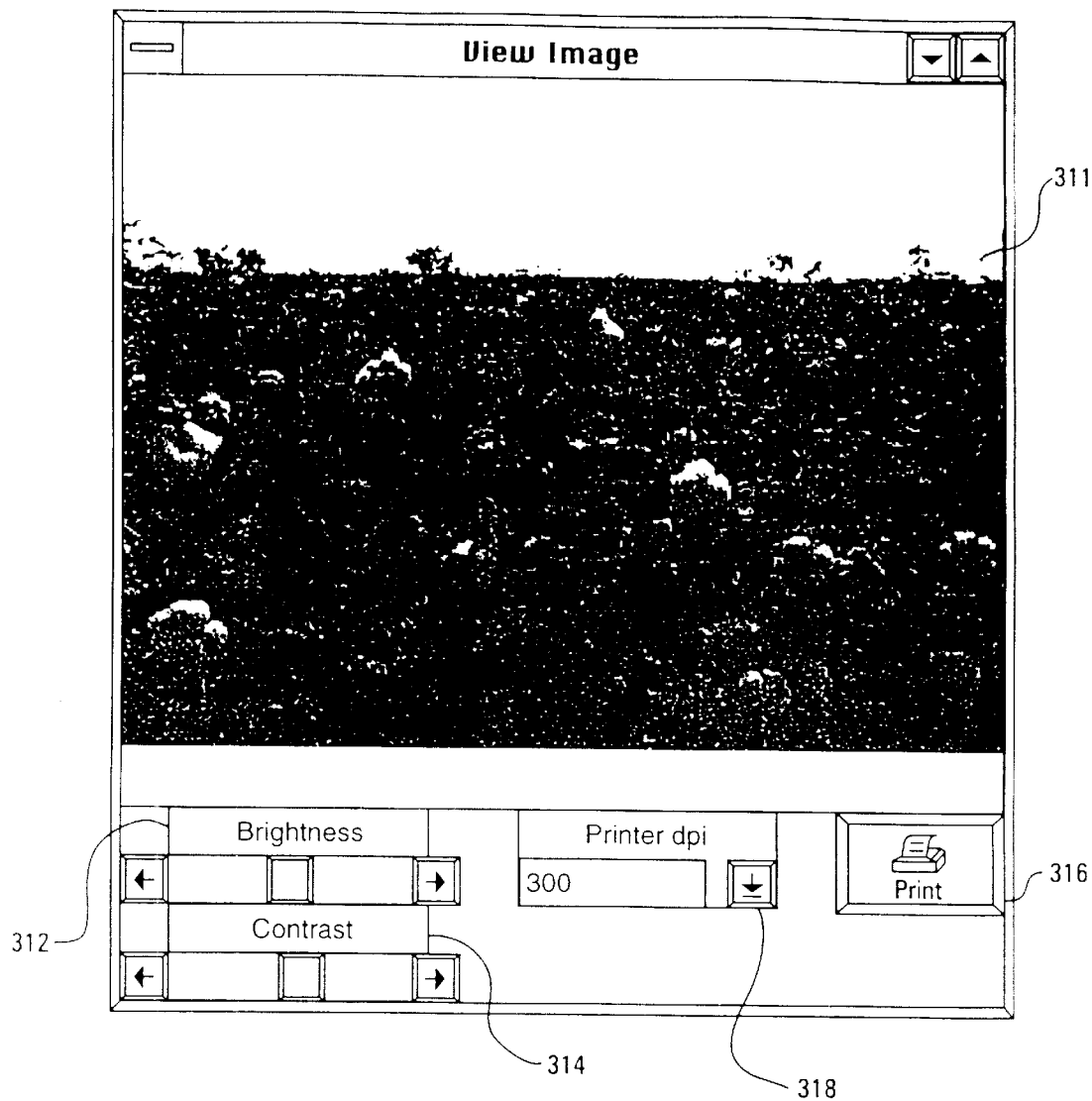
FIG. 9 shows the image view screen.

With reference to FIGS. 8 and 9, the image path screen 190 and its functions will be described. As shown in FIG. 8, the image path screen 190 queries the user to enter the path to the desired image file stored in the image database 31 in the query window 192. There are three windows: a drive window 194 which displays which drive 195 is being used, a directory window 196 which displays the directories 197 in the drive 195 displayed in the drive window 194, and the files window 198 which displays the files 199 of the directory 197 selected in the directory window 196. Also, the image path screen 190 has buttons for view 300, delete 302, add 304, save 306, and cancel 308.

The image path screen 190 uses the Field ID number 222 from the farm entry screen 120 to select all records in the image database 31 that match the ID number 222 and puts these into a temporary folder 19. If the temporary file 19 does not contain any records, all of the buttons, text boxes and windows are disabled except for the add and cancel buttons. In order to continue, the user must add a record to the temporary folder 19 and the image database folder 31 by using the add button 304. Alternatively, the user could use the cancel button 308 to exit the image path screen 190 and return to the farm entry screen 120.

The user selects the path for the image he would like displayed by selecting the appropriate drive 195 in the drive window 194. Then, selecting one of the directories 197 which will be displayed in the directories window 196. The directories 197 displayed in the window 196 correspond to the directories contained in the selected drive 195. From the directory 197, the user chooses a folder 191. The files 199 contained in the folder 191 are displayed in window 198. The user then chooses the desired image file 199. This selected path is displayed in the query window 192.

The user may select the view button 300 to view this image on the monitor 16. FIG. 9 shows a view image screen 310 which shows the picture 311 selected by the user via the image path screen 190. The brightness and contrast of the picture can be adjusted using the brightness and contrast buttons 312, 314 respectively. Also, the image can be printed on the printer 18 by using the print button 316. The printer's resolution may be selected by clicking on the down arrow to the right of the printer's resolution text box and making selection from the available list.

Images 311 can also be added to the map 82 (see FIG. 5). Images or a picture of an oddly shaped field or the satellite photograph of the entire county can be used to superimpose the photograph of the field 85 onto the map 82 (see FIG. 5). The user can then trace the field onto the map 82.

The up and down arrows 181, 183 allow the user to view and edit different records in the temporary folder 19. The save button 182 can be used to update the current record in the temporary folder and the corresponding record in the image database 31. When the delete button 302 is used, the current record in the temporary folder 19 and the corresponding record in the image database 31 are deleted.

The cancel button 308 is used to exit the image path screen 190, which will return the user to the farm entry screen 120 (see FIG. 6). If the user selects the cancel button 140 in the farm entry screen 120, then the user will be in the map screen 80 (see FIG. 5). From this screen 80, the user can also record soil test data by selecting the soil test icon 134.

Soil Test

Figure 10:
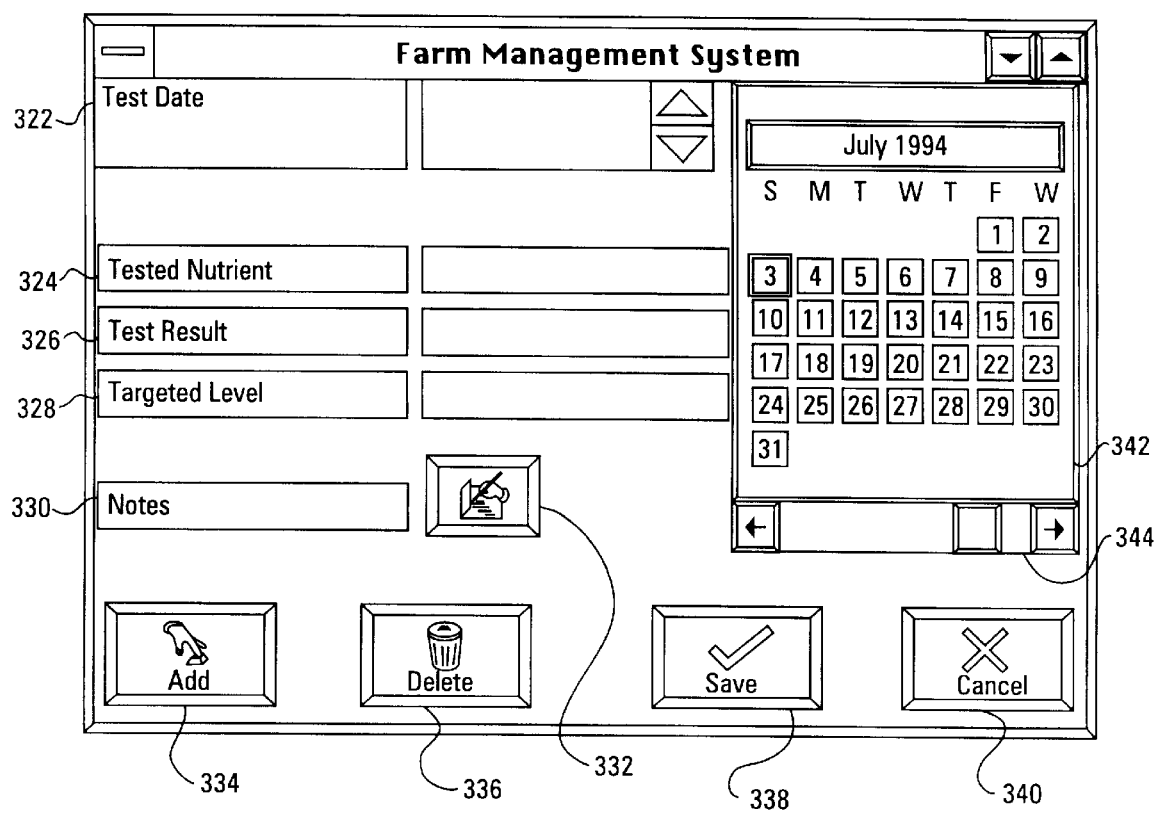
FIG. 10 shows the soil test data screen.

FIG. 10 shows the soil test data screen 320 which will be displayed on the monitor 16 when the user selects the soil test button 134 on the map screen 80. The soil test data screen 320 has text boxes for test date 322, tested nutrient 324, test result 326, and targeted level 328. The screen 320 has buttons for notes 332, add 334, delete 336, save 338, and cancel 340. Moreover, the soil test data screen 320 has a calendar 342.

When the soil test icon 134 is selected, the CPU 12 causes MapInfo to call a procedure that executes a Visual Basic application that contains the soil test data screen 320. MapInfo uses the DDE link to pass to the soil test data screen 320 the field ID number 122 for the selected field 85. Visual Basic checks first for any preexisting soil test screens 320 and closes any that it finds.

The soil test screen 320 uses the field ID number 222 to select from the soil sample database 29 all records that have the same ID number and the selected records are sorted in accordance with the test date 322 with the record having the latest test date 322 on top. The information from this most current record is placed in the test date 322, tested nutrient 324, test result 326, and targeted level 328 text boxes. If there are no existing soil sample records for a particular field 85, the user may use the add button 334 to add a record or the user may use the cancel button 340 to exit the soil test data screen 320.

As with the other screens previously described, the test date 322 can be edited by using the calendar 242. The scroll bar 344 can be used to move the calendar 242 to the desired month and year. To edit the tested nutrient, test result, and targeted level text boxes 324, 326, and 328, the user must type in the new information into the appropriate text box.

The up and down arrows 346, 348 are used to access the other records having the same field number 222. The save button 338 is used to update the current record in the soil sample database 29 for this particular field 85. The user may then exit the soil test data screen 320 and return to the map screen 80 (see FIG. 5).

Weather Related Claims

This system 10 can also be used for checking the validity of crop damage claims caused by weather. To verify a claim's validity, from the map screen, the claim validity icon 350 is selected. By selecting this icon 350, MapInfo calls a procedure that executes a Visual Basic application that contains the claim validation screen 352.

Figure 11:
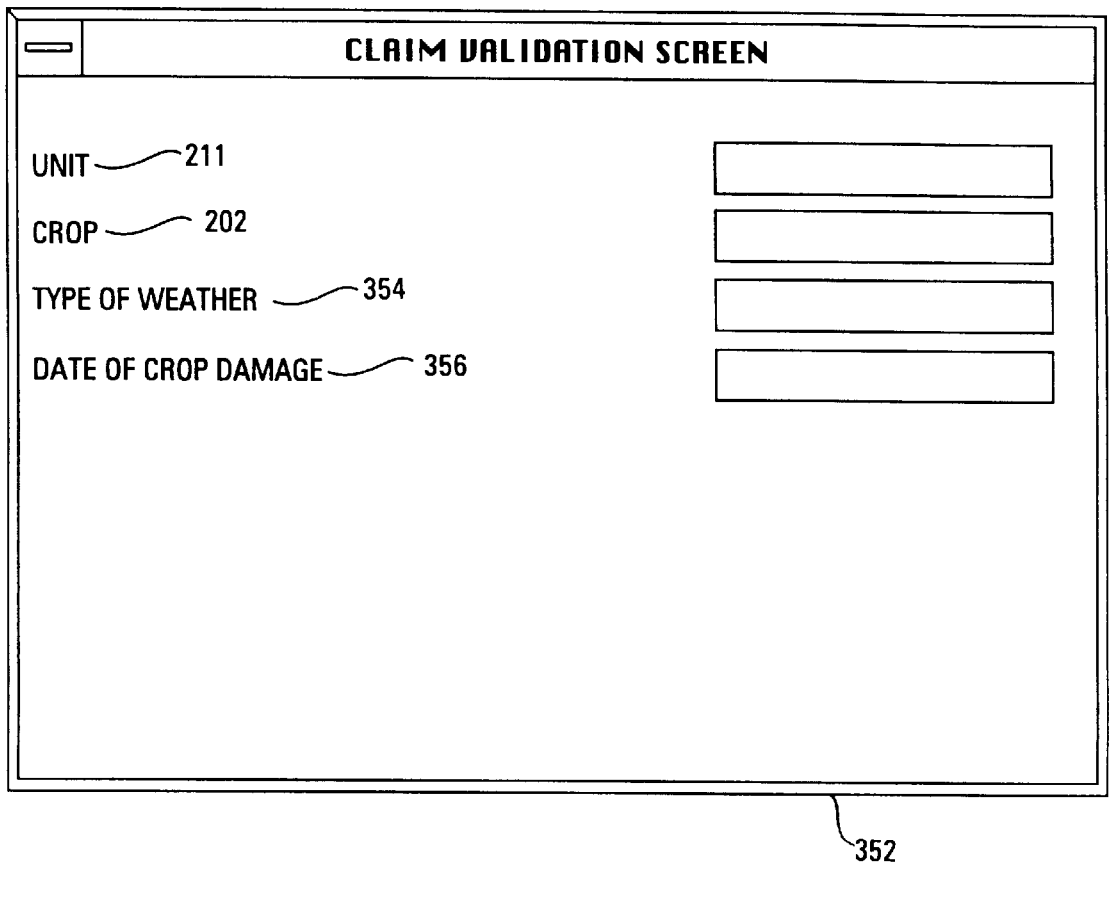
FIG. 11 shows the claim validation screen.

As shown in FIG. 11, the claim validation screen 352 has a text box for the crop 202, unit 214, type of weather 354 which caused the crop damage and a text box for the date the crop was damaged 356. Through the mapping program, the system identifies all fields 85 seeded to the given crop and unit and plots the location of each field to access the weather data from the weather database 34 for the date the crop was damaged. The system 10 then compares the weather type entered in text box 354 with the weather which occurred in the region where the field 85 or fields are located. The system is then able to determine the validity of the claim.

While a preferred embodiment of the present invention has been described, it should be appreciated that various modifications may be made by those skilled in the art without departing from the spirit and scope of the present invention. Accordingly, reference should be made to the claims to determine the scope of the present invention.

What is claimed is:

1. A computer implemented method for acquiring, organizing, and processing field-related data which is then used to rate each field, the method being implemented on a map-driven, farm management system and comprising the steps of:

(a) defining in a memory unit of the system for at least one policyholder the policies held by each of the at least one policyholder;

(b) providing to a memory unit of the system map information for the regions in which at least one policyholder exists said map information includes standard boundary identifiers;

(c) receiving via an interface on a monitor in the system the name of a policyholder and the policy to be modified, as selected by a user;

(d) generating from said provided map information and displaying on the monitor in the system a map section of the fields associated with the selected policy;

(e) upon a user's graphical identification and selection of a displayed field, interactively eliciting from the user and storing in a data structure corresponding to the selected field, field-related data pertaining to the selected field;

(f) verifying that field-related data has been entered for each field associated with the particular policy;

(g) verifying that optional units have not been created for fields contained in the same section;

(h) rating at least the selected field based at least upon field-related data pertaining to the selected field and map information corresponding to said selected field; and (i) making available the results of said rating to the user.

2. A farm management system implemented method for assessing crop insurance on a policy covering at least one field, the method comprising the steps of:

(a) providing to a memory unit of the system map information for a region in which the crop field(s) to be covered are located, said map information including standard map boundary identification information;

(b) displaying on a system interface monitor a map section image of the region, wherein the image is generated from the provided map information;

(c) responsive to a user's graphical definition of the field(s) to be covered by the policy, defining said field(s) in the memory unit of the system,;

(d) receiving from the user and storing in an associated system data structure field-related data for each defined field(s), wherein each data structure is linked to its associated defined field; and (e) validating the stored field-related data against governmental regulations to confirm that the field(s) to be covered are insurable.

3. The method of claim 2 further comprising the step of rating the policy after the insurability of the policy has been confirmed.

4. The method of claim 3, wherein the step of rating the policy is implemented by separately rating the defined crop field(s).

5. The method of claim 2 further comprising the step of verifying that optional units are not created for fields contained in the same section.

6. The method of claim 2, wherein the standard map boundary identification information includes street, river, county, section, and township/range boundaries.

7. The method of claim 2, wherein the user implements a map tool to define the covered field(s).

8. The method of claim 7, wherein the map tool is a drawing tool.

9. The method of claim 7, wherein the map tool is a graphical user interface function that enables the user to identify the field by positioning the curser at a selected location on the map image and entering the desired area for the field to be defined.

10. The method of claim 2, wherein the field-related data includes the amount of the field to be utilized by a particular crop.

11. The method of claim 10, wherein the area of the field to be utilized for a particular crop is entered by the user into the system via a map tool while the defined field is being displayed upon the monitor.

12. In a farm management system having a display wherein a map is displayed, the map including standard boundary identifiers such as street, river, county, section, and township/range boundaries, a method for defining a field within the system and storing field-related data, pertaining to the defined field, into the system, the method comprising the steps of:

(a) generating and displaying a map having boundary identifiers;

(b) selecting a map tool from a plurality of map tools, wherein the selection of said map tool causes a map tool curser to be displayed;

(c) positioning the map tool curser on an area of the map corresponding to that of the field to be defined, wherein a user identifies said area in relation to said standard boundary identifiers and correspondingly generates a displayed boundary of the field upon the map display with the selected map tool;

(d) defining the field within a memory unit of the system in response to the user's generation of the displayed field boundary;

(e) defining a data structure within the system, the data structure being linked to the memory unit where said field is defined;

(f) displaying a data entry form in response to the user's selection of a data entry option for the defined field, the form corresponding to said defined data structure; and (g) storing field-related data into said data structure in response to the user entering said data onto the displayed form, whereby the stored data pertains to the defined field.

13. The method of claim 12 wherein the step of storing field-related data includes the act of storing data sufficient for assessing the insurability of crops to be planted within the defined field.

14. The method of claim 13 further comprising the step of rating a crop insurance policy for the defined field in response to a user selecting a crop insurance rating option.

15. The method of claim 12 further comprising the step of verifying that the defined field, in connection with its stored field-related data, complies with applicable regulations.

16. The method of claim 12 further comprising the step of generating a report for the defined field.

17. The method of claim 12 wherein the selected map tool is a map drawing tool and the map tool curser is a map drawing tool curser, whereby the user generates the displayed boundary of the field by activating the map drawing tool and tracing the field boundary upon the map display with the map drawing tool curser.

18. The method of claim 12 wherein the map tool enables the user to define the field by positioning the map tool curser on a selected position on the map display, activating the selected map tool and entering the magnitude of the field's area.

19. The method of claim 12 wherein the step of defining a data structure includes the act of defining a series of relationally linked records, wherein each record of the series stores a unique group of field-related data and has a geographical object associated with it.

20. The method of claim 19 wherein a plurality of data entry forms are utilized to enter and store field-related data into the series of records.

21. The method of claim 12 wherein the step of defining the field within a memory unit includes the acts of (1) determining the field's size and location, (2) assigning to the field a unique identifier, (3) creating a unique geographical object to identify the field boundary; and (4) storing this information into the memory unit.

22. The method of claim 21 wherein the act of determining the field's size includes the acts of (1) cross-referencing its location with a record including Agricultural Soil Conservation Service data and determining its Agricultural Soil Conservation Service assigned area therefrom.

23. In a farm management system having a display wherein a map is displayed, the map including a field, which is defined in a system memory unit, a method for defining within the system a crop region located within the field and for storing within the system field-related data pertaining to the crop region, the method comprising the steps of:

(a) generating and displaying a map having an identifiable field;

(b) selecting a map tool from a plurality of map tools, wherein the selection of said map tool causes a map tool curser to be displayed;

(c) positioning the selected map tool curser on an area within the field corresponding to that of the crop region to be defined, wherein a user generates a displayed boundary of the crop region, within the field upon the map display, using the selected map tool;

(d) defining the crop region within a data structure of the system in response to the user's generation of the displayed crop region boundary, the data structure being linked to the system memory unit where the field is defined;

(e) displaying a data entry form in response to the user's selection of a data entry option for the defined field, the form corresponding to said defined data structure; and (f) storing field-related data into said data structure in response to the user entering said data onto the displayed form, whereby the stored data pertains to the defined crop region.

24. The method of claim 23 wherein the step of storing field-related data includes the act of storing data sufficient for assessing the insurability of the crop to be planted within the defined crop region.

25. The method of claim 24 further comprising the step of rating a crop insurance policy for the defined field in response to a user selecting a crop insurance rating option.

26. The method of claim 24 further including the act of defining crop regions for a plurality of identified fields, whereby field-related data for each crop region is stored in a separate data structure.

27. The method of claim 26 further comprising the step of rating a crop insurance policy for the defined field in response to a user selecting a crop insurance rating option.

28. The method of claim 23 further comprising the step of verifying that the defined crop region, in connection with its stored field-related data, complies with applicable regulations.

29. The method of claim 23 further comprising the step of generating a report for the defined field.

30. The method of claim 23 wherein the step of selecting a map tool includes the act of selecting a drawing tool, wherein the map tool curser is a drawing tool curser, whereby the user generates the displayed boundary of the crop region by activating the drawing tool and tracing the crop region boundary upon the map display with the drawing tool curser.

31. The method of claim 23, wherein the step of defining a crop region is implemented by the system in response to the user positioning the map tool curser on a latitude and longitude coordinate of the map display within the identifiable field, activating the selected map tool and entering the magnitude of the field's area.

32. The method of claim 23 wherein the step of defining a data structure includes the act of defining a series of relationally linked records, wherein each record of the series stores a unique group of field-related data.

33. The method of claim 32 wherein a plurality of data entry forms are utilized to enter and store field-related data into the series of records.

34. A farm management system for storing, organizing and evaluating field specific, field-related data for a plurality of fields to be defined within the system, comprising:

(a) a display;

(b) a processor operatively connected to said display;

(c) an input device operatively connected to the processor; and (d) memory having (1) map data corresponding to a geographical region including the plurality of fields, and (2) computer software operative by the processor comprising:

(i) software instructions for displaying on the display a map image generated from the map data, whereby the map image includes the geographical region including the plurality of fields, (ii) software instructions for defining each of the plurality of fields in a separate field data structure as each field is graphically defined by a user with a map tool, wherein said field data structures are defined in said memory, (iii) software instructions for receiving from the user and storing in a separate crop data structure, for each field, field-related data corresponding to a particular field, wherein each crop data structure is relationally linked to a corresponding field data structure, and (iv) software instructions for assessing the crop insurability of the fields based at least upon the stored field-related data.

35. The system of claim 34 wherein the computer software performs the additional step of generating a report on the fields in connection with the stored field-related data.

36. The system of claim 34 wherein the computer software performs the additional step of rating a crop insurance policy to cover at least one of the plurality of fields.

37. The system of claim 34 wherein the map tool is a map drawing tool, whereby the user defines each field by activating the drawing tool and tracing each field's boundary upon the displayed map image.

38. The system of claim 34, wherein the map tool is a graphical user interface function enabling the user to define each field by positioning a curser at a selected location on the displayed map image and entering the desired area for the field to be defined.

39. The system of claim 34 wherein the executing program step of defining in a field data structure a field includes the step of determining the area of the field in response to the user's graphical definition thereof.

40. The system of claim 34, wherein the field-related data for each field pertains to a single crop.

41. The system of claim 34 wherein the executing program step of storing field-related data in a crop data structure includes the step of storing the area to be utilized for a particular crop.

42. The system of claim 41, wherein the area to be utilized for a particular crop is graphically entered by a user into the system via a map tool while the corresponding defined field is being displayed.

43. The system of claim 34, wherein the executing program performs the additional step of verifying that the fields comply with applicable regulations based at least upon their locations and corresponding field-related data.

44. The system of claim 43, wherein the regulations are crop insurance regulations.

45. A farm management system for storing and organizing field-related data comprising:
   (a) a computing device having a memory and a display;
   (b) a map data structure in the memory having map data for the generation and display of map images, the map images including fields to be selected by a user for the entry of associated field-related data;
   (c) a plurality of field data structures in the memory for storing field identification data, wherein each field data structure is linked to and associated with a corresponding field image from the map data structure, the field identification data including field size and location;
   (d) a plurality of crop data structures in the memory for storing field-related data, wherein field-related data corresponding to a particular crop is stored in a particular crop data structure and each crop data structure is relationally linked to the field data structure that corresponds to the field where said particular crop is planted; and
   (e) a program to be executed by the computing device for (1) generating and displaying upon the display a map image, (2) eliciting and receiving from a user field-related data for a crop within a field selected by the user, and (3) storing said field-related data in a crop data structure that is relationally linked to the field data structure corresponding to the selected field, wherein said user graphically identifies and selects said field with a map interface tool.

46. The system of claim 45 wherein the field-related information includes the area of the selected field that is consumed by the particular crop, wherein the executing program determines said area in response to the user graphically defining the crop's boundary within the displayed selected field, the user defining said boundary with a map tool.

47. The system of claim 45 wherein each of the crop data structures is comprised of relationally linked lower-level data structures.

48. The system of claim 45 further comprising a soil sample database in the memory for storing soil test data on the plurality of fields, the soil sample database including a soil sample data structure for each field, wherein each soil sample data structure is linked to its corresponding field data structure by a common field identifier.

49. The system of claim 45 wherein the executing program performs the additional task of rating a selected field for crop insurance.

50. The system of claim 49 wherein the executing program further performs the task of optimizing an insurance policy for a defined set of fields.

51. A crop insurance assessment system comprising:
   (a) computing means having a display and a memory;
   (b) program means to be executed by said computing means for implementing the crop insurance assessment system, said program means including:
      (i) means for displaying a map image upon the display, wherein said map image includes a plurality of fields,
      (ii) means for eliciting from a user and storing into said memory field-related data associated with fields that are to be covered by a crop insurance policy; and
      (iii) means for assessing the insurability of the policy based at least upon the location(s) of the covered fields, and the associated field-related data.

52. The system of claim 51 further comprising means for separately rating each field to be covered by said policy.

53. The system of claim 51 further comprising validation means for validating a claim made on said policy.

54. The system of claim 53 wherein said validation means includes a weather database for verifying the veracity of a weather-related claim.

55. A memory storage device having instructions that when executed cause a farm management system to implement a method for assessing crop insurance on a policy covering at least one field, the method comprising the steps of:
   (a) providing to a memory unit of the system map information for a region in which the crop field(s) to be covered are located, said map information including standard map boundary identification information;
   (b) displaying on a system interface monitor a map section image of the region, wherein the image is generated from the provided map information;
   (c) responsive to a user's graphical definition of the field(s) to be covered by the policy, defining said field(s) in a memory unit of the system,;
   (d) receiving from the user and storing in an associated system data structure field-related data for each defined field(s), wherein each data structure is linked to its associated defined field; and
   (e) validating the stored field-related data against governmental regulations to confirm that the field(s) to be covered are insurable.

56. A memory storage device having instructions that when executed cause a computer system to implement a method for organizing field-related data, the method comprising the steps of:
   (a) defining in a memory unit of the system map information corresponding to a region that includes a field wherein a crop is to be planted;
   (b) displaying on a system monitor a map image generated from the map information, wherein the map image includes standard boundary identifiers;
   (c) defining in a system field data structure a field as it is graphically identified and defined by a user with a map tool;
   (d) receiving from a user and storing in a system crop data structure field-related data related to the defined field, the crop data structure being relationally linked to the field data structure; and
   (e) assessing the crop insurability of the field.

* * * * *